US006677687B2

(12) United States Patent
Ho et al.

(10) Patent No.: US 6,677,687 B2
(45) Date of Patent: Jan. 13, 2004

(54) SYSTEM FOR DISTRIBUTING POWER IN CPCI COMPUTER ARCHITECTURE

(75) Inventors: Raymond K. Ho, San Jose, CA (US); Richard R. Creason, Palo Alto, CA (US); Victor E. Jochiong, Mill Valley, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 68 days.

(21) Appl. No.: 10/000,553

(22) Filed: Oct. 23, 2001

(65) Prior Publication Data

US 2003/0075984 A1 Apr. 24, 2003

(51) Int. Cl.$^7$ .................................................. H02J 1/00
(52) U.S. Cl. .............................. 307/43; 307/44; 361/788
(58) Field of Search ............................. 307/43, 64, 116, 307/44, 147; 361/683, 729, 730, 788

(56) References Cited

U.S. PATENT DOCUMENTS

| 4,651,020 A | * | 3/1987 | Kenny et al. ................. 307/43 |
| 5,101,313 A | * | 3/1992 | Neilson et al. ................ 361/10 |
| 5,200,643 A | * | 4/1993 | Brown ......................... 307/53 |
| 5,650,715 A | * | 7/1997 | Massie ......................... 323/273 |
| 5,861,684 A | * | 1/1999 | Slade et al. .................... 307/66 |
| 6,282,599 B1 | * | 8/2001 | Gallick et al. ................ 710/306 |
| 6,294,848 B1 | * | 9/2001 | Goodrich, II ............... 307/147 |
| 6,421,215 B1 | * | 7/2002 | Bushue ...................... 361/93.1 |
| 6,425,027 B1 | * | 7/2002 | Mills et al. ................... 710/300 |
| 6,448,672 B1 | * | 9/2002 | Voegeli et al. ................ 307/52 |
| 6,483,709 B1 | * | 11/2002 | Layton ....................... 361/724 |

FOREIGN PATENT DOCUMENTS

DE          19954942 A1 *   5/2001

* cited by examiner

*Primary Examiner*—Gregory J. Toatley, Jr.
*Assistant Examiner*—Sharon A. Polk
(74) *Attorney, Agent, or Firm*—O'Melveny & Myers LLP (57) ABSTRACT

A system for distributing power in a compact peripheral component interconnect (CPCI) computer architecture is provided. A CPCI computer architecture comprises a plurality of CPCI systems each having respective backplanes. The backplanes further having respective local power rails providing power for a corresponding one of the plurality of CPCI systems. The power distribution system provides power to the backplanes, and comprises a common power rail connected to each one of the local power rails of the backplanes. A plurality of power supplies is connected to the common power rail of the power distribution system. Power taken from any one of the plurality of power supplies is available to any one of the backplanes.

19 Claims, 10 Drawing Sheets

SYSTEM FOR DISTRIBUTING POWER IN CPCI COMPUTER ARCHITECTURE

BACKGROUND OF THE INVENTION

1. Field of the Invention

The present invention relates to Compact Peripheral Component Interconnect ("CPCI") computer systems. More particularly, the present invention relates to providing reliable power redundancy in a CPCI computer architecture.

2. Description of Related Art

CPCI is a high performance industrial bus based on the standard PCI electrical specification in rugged 3U or 6U Eurocard packaging. CPCI is intended for application in telecommunications, computer telephony, real-time machine control, industrial automation, real-time data acquisition, instrumentation, military systems or any other application requiring high speed computing, modular and robust packaging design, and long term manufacturer support. Because of its extremely high speed and bandwidth, the CPCI bus is particularly well suited for many high-speed data communication applications such as servers, routers, converters, and switches.

Compared to standard desktop PCI, CPCI supports twice as many PCI slots (8 versus 4) and offers a packaging scheme that is much better suited for use in industrial applications. Conventional CPCI cards are designed for front loading and removal from a card cage. The cards are firmly held in position by their connector, card guides on both sides, and a faceplate that solidly screws into the card cage. Cards are mounted vertically allowing for natural or forced air convection for cooling. Also, the pin-and-socket connector of the CPCI card is significantly more reliable and has better shock and vibration characteristics than the card edge connector of the standard PCI cards.

Conventional CPCI defines a backplane environment that is limited to eight slots. More specifically, the bus segment of the conventional CPCI system is limited to eight slots, which includes a system slot and peripheral slots. The system slot provides the clocking, arbitration, configuration, and interrupt processing for up to seven peripheral slots.

As is commonly practiced in the art, redundant power is often provided to conventional CPCI computer systems in order to provide stability in the event of power failure. In particular, it has become common in the art to provide redundant power to CPCI backplanes in the form of a secondary power supply. Within these CPCI systems, the primary and secondary power supplies both deliver power to a local power rail on the CPCI backplane. As a result, the CPCI backplane is always provided with power from one power supply in the event of a power failure in the other.

In order to accommodate systems using multiple backplanes, additional power supplies are ordinarily included in the art. In particular, the addition of a second backplane typically requires the addition of a second set of two power supplies. Similar to the aforementioned single-backplane architecture, a dual-backplane architecture routs redundant power to the first backplane by delivering power to the local power rail of the first backplane directly from the first set of two power supplies. Redundant power is then also routed to the second backplane by delivering power to the local power rail of the second backplane directly from the second set of two power supplies. As a result, both backplanes are provided with power stability whenever a single power supply fails within this architecture.

A drawback of this architecture is that it cannot support the emergence of more sophisticated backplanes requiring an increasing amount of power. In particular, the dual-backplane architecture described above is limited in that the power available to either backplane is cut in half whenever one of its respective power supplies fails. As a result, backplanes requiring additional power (i.e., more than a single power supply) do not have sufficient power within this type of architecture.

Accordingly, it would be advantageous to implement an architecture in which additional power, taken from any power supply connected to the CPCI system, is available to any of its backplanes.

SUMMARY OF THE INVENTION

The present invention relates to a system and apparatus for distributing power in a compact peripheral component interconnect (CPCI) computer architecture. More specifically, a CPCI computer architecture comprises a plurality of CPCI systems each having respective backplanes. The backplanes further having respective local power rails providing power for a corresponding one of the plurality of CPCI systems. A power distribution system provides power to the backplanes, and comprises a common power rail connected to each one of the local power rails of the backplanes. A plurality of power supplies is connected to the common power rail of the power distribution system. Power taken from any one of the plurality of power supplies is available to any one of the backplanes.

A more complete understanding of a system and apparatus for distributing power in CPCI computer systems will be afforded to those skilled in the art, as well as a realization of additional advantages and objects thereof, by a consideration of the following detailed description of the preferred embodiment. Reference will be made to the appended sheets of drawings which will first be described briefly.

BRIEF DESCRIPTION OF THE DRAWINGS

FIG. 4(*a*) shows a front view of a conventional CPCI backplane in the 6U form factor;

FIG. 4(*b*) shows a back view of a conventional CPCI backplane in the 6U form factor;

DETAILED DESCRIPTION OF THE PREFERRED EMBODIMENT

The present invention satisfies the need for a CPCI system having multiple backplanes in which power is more efficiently distributed. More particularly, the present invention provides an architecture in which additional power, taken from any power supply connected to the CPCI system, is available to any backplane. In the detailed description that follows, like element numerals are used to describe like elements shown in one or more of the drawings.

Figure 1:
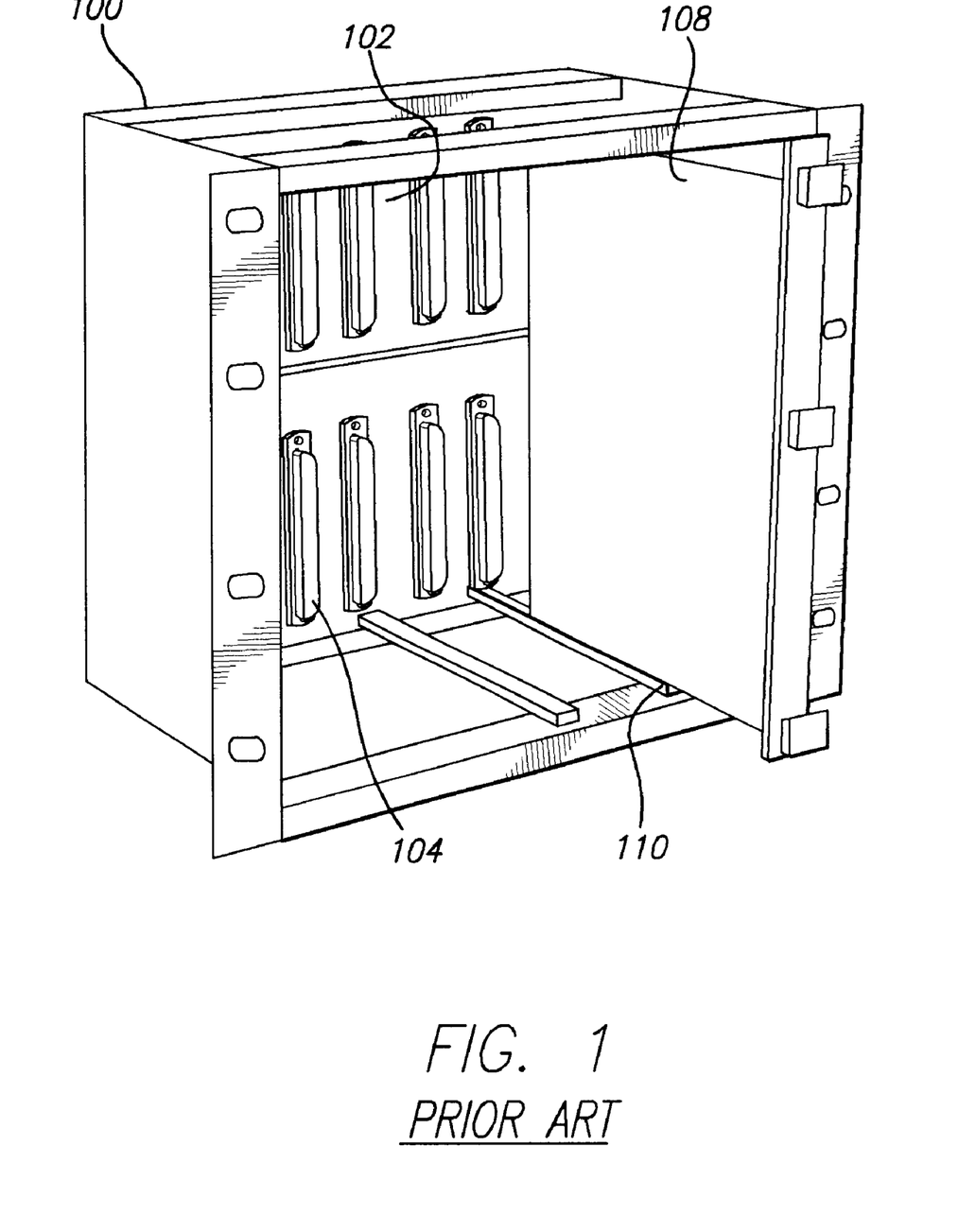
FIG. 1 is a perspective view of a conventional CPCI chassis system.

Referring to FIG. 1, there is shown a perspective view of a conventional CPCI chassis system. The chassis system 100 includes a CPCI circuit board referred to in the conventional CPCI system as a passive backplane 102 since the circuit board is located at the back of the chassis 100 and add-on cards (front cards) can only be inserted from the front of the chassis 100. On the front side of the backplane 102 are slots provided with connectors 104. In the conventional chassis system 100 that is shown, a 6U daughter card 108 is inserted into one of the slots and mates with a corresponding one of the connectors 104. For proper insertion of the daughter cards 108 into the slots, card guides 110 are provided. This conventional chassis system 100 provides front removable daughter cards and unobstructed cooling across the entire set of daughter cards 108.

Figure 2:
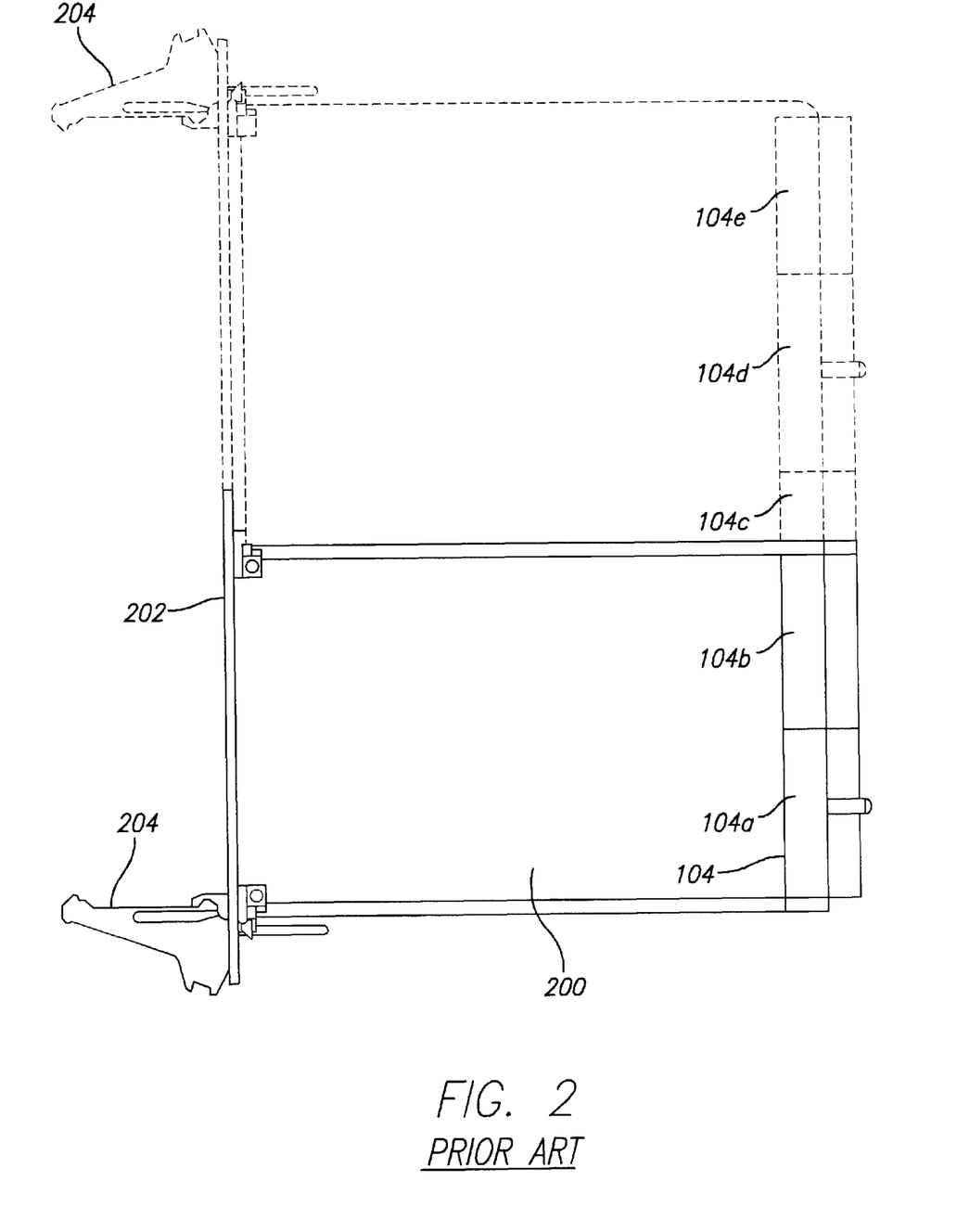
FIG. 2 shows the form factor that is defined for the CPCI daughter card.

Referring to FIG. 2, there is shown the form factor defined for the CPCI daughter card, which is based on the Eurocard industry standard. As shown in FIG. 2, the daughter card 200 has a front plate interface 202 and ejector/injector handles 204. The front plate interface 202 is consistent with Eurocard packaging and is compliant with IEEE 1101.1 or IEEE 1101.10. The ejector/injector handles should also be compliant with IEEE 1101.1. One ejector/injector handle 204 is used for 3U daughter cards, and two ejector/injector handles 204 are used for 6U daughter cards. The connectors 104a–104e of the daughter card 200 are numbered starting from the bottom connector 104a, and both 3U and 6U daughter card sizes are defined, as described below.

The dimensions of the 3U form factor are approximately 160.00 mm by approximately 100.00 mm, and the dimensions of the 6U form factor are approximately 160.00 mm by approximately 233.35 mm. The 3U form factor includes two 2 mm connectors 104a–104b, which is the minimum number of connectors that are required to accommodate a full 64 bit CPCI bus. Specifically, the 104a connectors are reserved to carry the signals required to support the 32-bit PCI bus, hence no other signals may be carried in any of the pins of this connector. Optionally, the 104a connectors may have a reserved key area that can be provided with a connector "key", which is a pluggable plastic piece that comes in different shapes and sizes, so that the add-on card can only mate with an appropriately keyed slot. The 104b connectors are defined to facilitate 64-bit transfers or for rear panel I/O in the 3U form factor. The 104c–104e connectors are available for 6U systems as shown in FIG. 1. The 6U form factor includes the two connectors 104a–104b of the 3U form factor, and three additional 2 mm connectors 104c–104e. In other words, the 3U form factor includes connectors 104a–104b, and the 6U form factor includes connectors 104a–104e. The three additional connectors 104c–104e of the 6U form factor can be used for secondary buses (i.e., Signal Computing System Architecture (SCSA) or MultiVendor Integration Protocol (MVIP) telephony buses), bridges to other buses (i.e., Virtual Machine Environment (VME) or Small Computer System Interface (SCSI)), or for user specific applications. Note that the CPCI specification defines the locations for all the connectors 104a–104e, but only the signal-pin assignments for the CPCI bus portion 104a and 104b are defined. The remaining connectors are the subjects of additional specification efforts, or can be user defined for specific applications, as described above.

Figure 3:
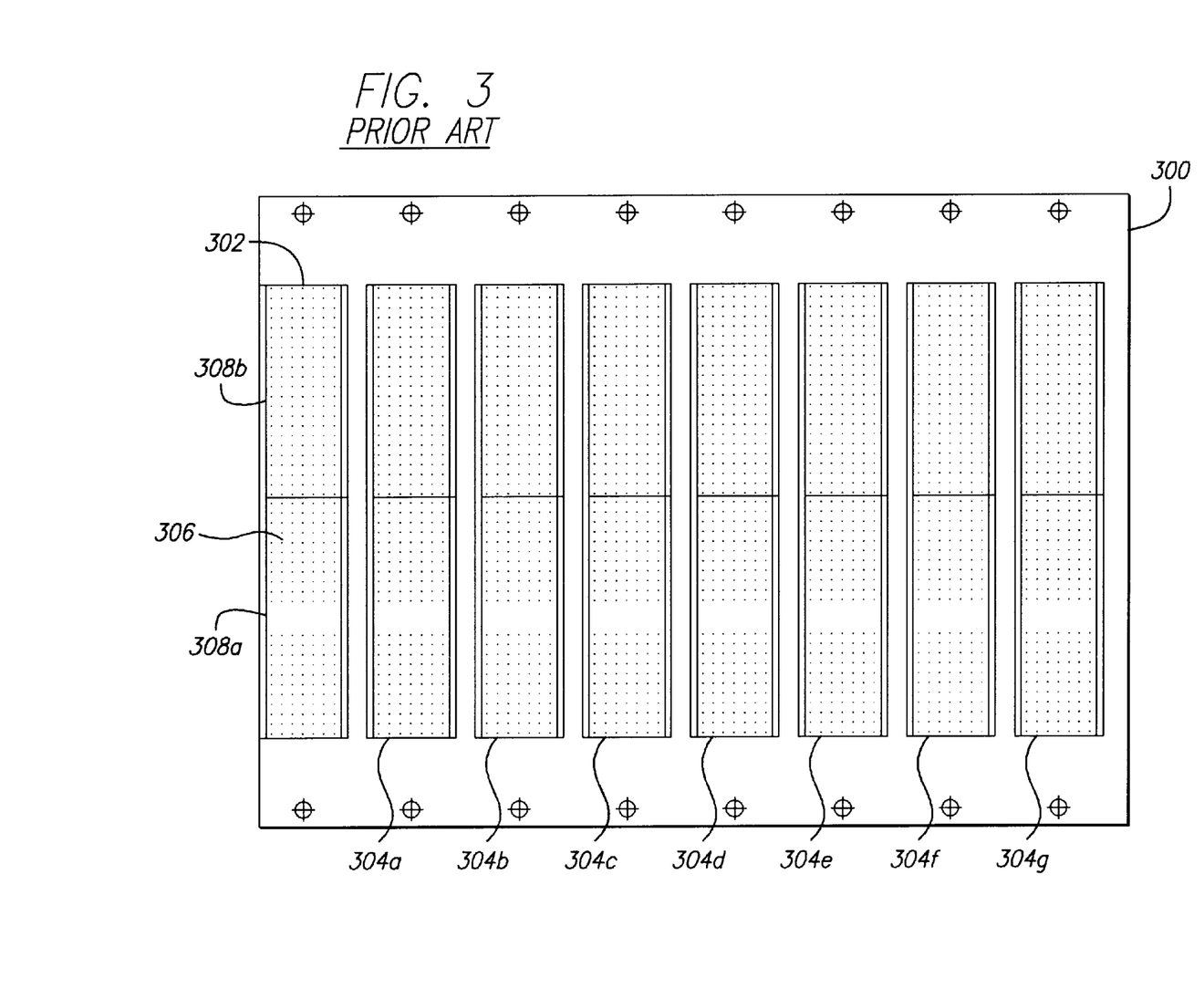
FIG. 3 is a front view of a conventional 3U backplane having eight slots with two connectors each.

Referring to FIG. 3, there is shown a front view of a conventional 3U backplane having eight slots with two connectors each. A CPCI system is composed of one or more CPCI bus segments, where each bus segment includes up to eight CPCI card slots. Each CPCI bus segment consists of one system slot 302, and up to seven peripheral slots 304a–304g. The CPCI daughter card for the system slot 302 provides arbitration, clock distribution, and reset functions for the CPCI peripheral cards on the bus segment. The peripheral slots 304a–304g may contain simple cards, intelligent slaves or PCI bus masters.

The connectors 308a, 308b have connector-pins 306 that project in a direction perpendicular to the backplane 300, and are designed to mate with the front side "active" daughter cards ("front cards"), and "pass-through" its relevant interconnect signals to mate with the rear side "passive" input/output (I/O) card(s) ("rear transition cards"). In other words, in the conventional CPCI system, the connector-pins 306 allow the interconnected signals to pass-through from the front cards to the rear transition cards.

Figure 4A:
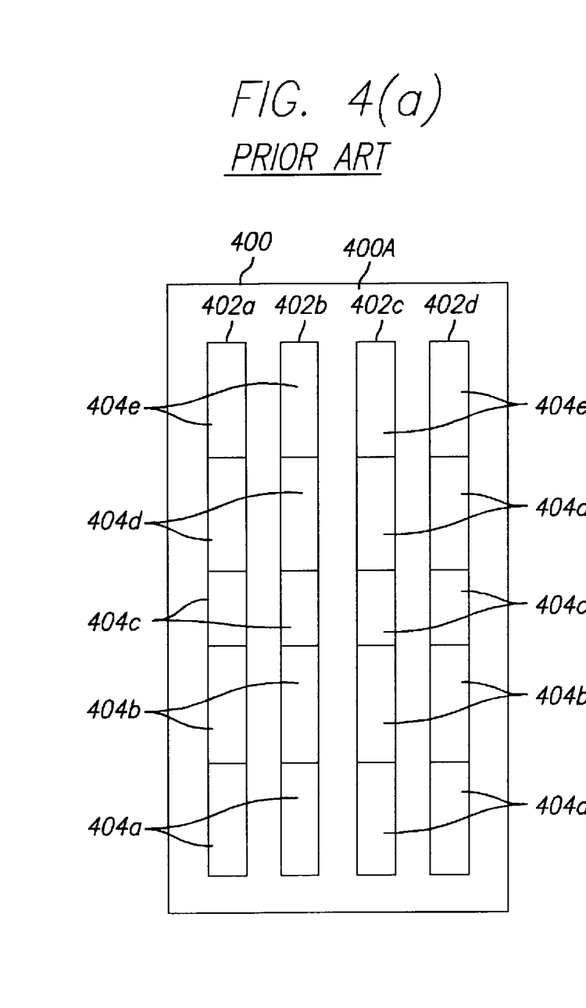
Figure 4B:
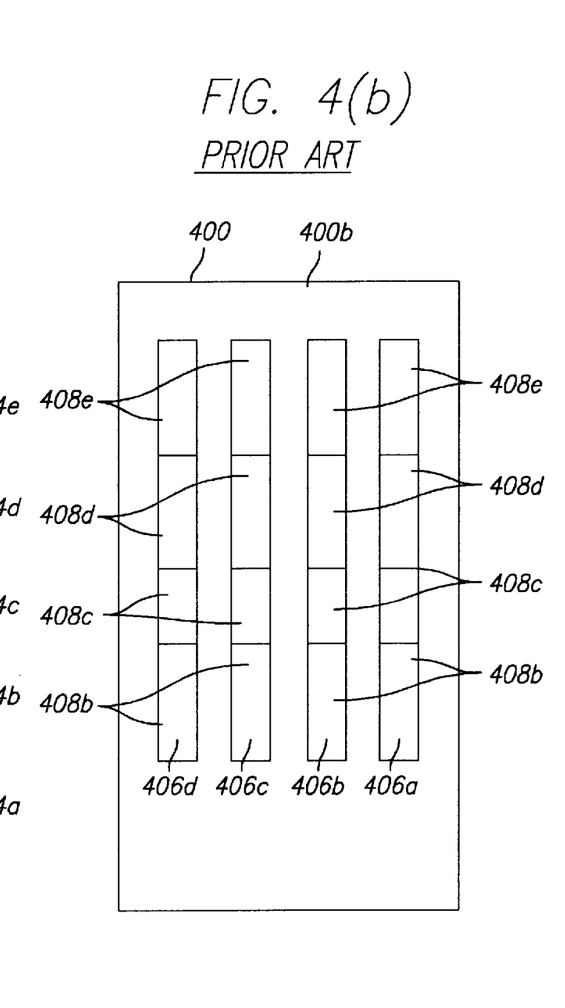

Referring to FIGS. 4(a) and 4(b), there are shown a front and back view of a conventional CPCI backplane in the 6U form factor, respectively. In FIG. 4(a), four slots 402a–402d are provided on the front side 400a of the backplane 400. In FIG. 4(b), four slots 406a–404d are provided on the back side 400b of the backplane 400. Note that in both FIGS. 4(a) and 4(b) only four slots are provided instead of eight slots as in FIG. 3. Further, it is important to note that each of the slots 402a–402d on the front side 400a has five connectors 402a–404e while each of the slots 406a–404d on the back side 400b has only four connectors 408b–408e. This is because, as in the 3U form factor of the conventional CPCI system, the 404a connectors are provided for 32 bit PCI and connector keying. Thus, they do not have I/O connectors to their rear. Accordingly, the front cards that are inserted in the front side slots 402a–402d only transmit signals to the rear transition cards that are inserted in the back side slots 406a–404d through front side connectors 404b–404e.

Figure 5:
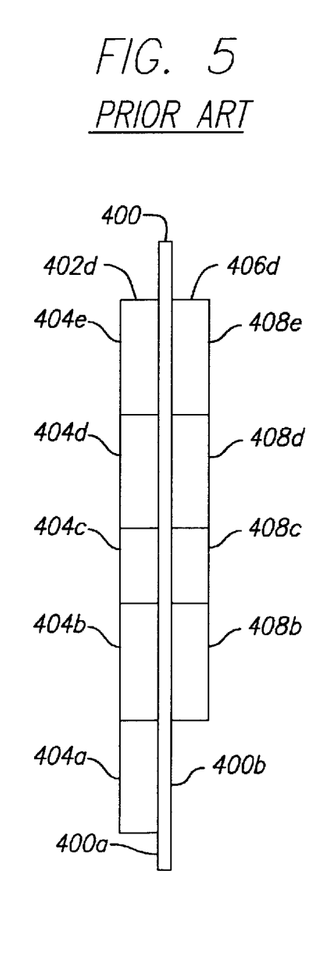
FIG. 5 shows a side view of the conventional backplane of FIGS. 4(*a*) and 4(*b*)

Referring to FIG. 5, there is shown a side view of the conventional backplane of FIGS. 4(a) and 4(b). As shown in FIG. 5, slot 402d on the front side 400a and slot 406d on the back side 400b are arranged to be substantially aligned so as to be back to back. Further, slot 402c on the front side 400a and slot 406c on the backside 400b are arranged to be substantially aligned, and so on. Accordingly, the front side connectors 404b–404e are arranged back-to-back with the back side connectors 408b–408e. Note that the front side connector 404a does not have a corresponding back side connector. It is important to note that the system slot 402a is adapted to receive the CPU front card, and the signals from the system slot 402a are then transmitted to corresponding connector-pins of the peripheral slots 402b–402d. Thus, the conventional CPCI system can have expanded I/O functionality by adding peripheral front cards in the peripheral slots 402b–402d.

Figure 6:
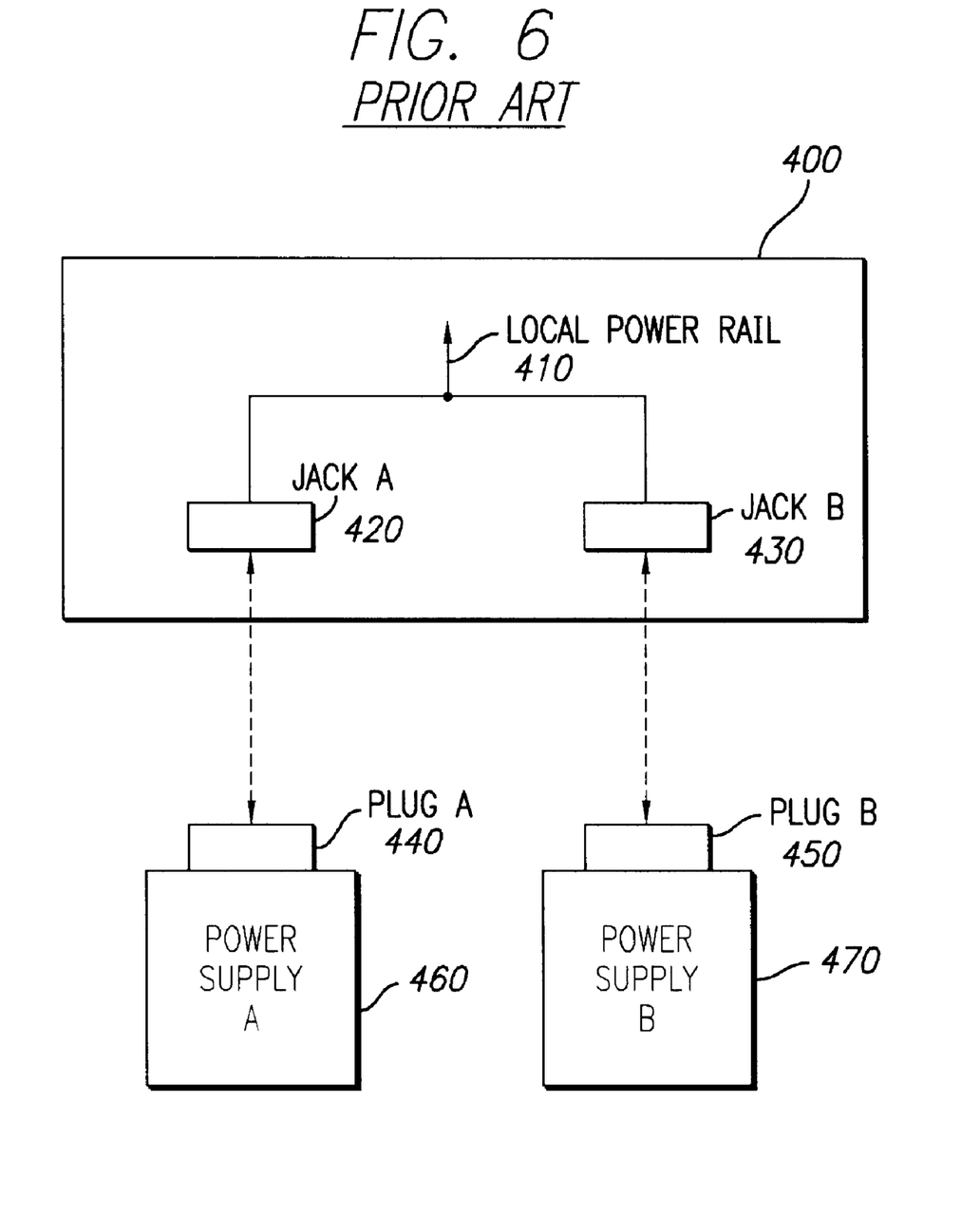
FIG. 6 is a schematic diagram showing a conventional method for providing power to a single backplane.

As previously stated, redundant power is ordinarily provided to conventional backplanes 400 in order to safeguard the system against power failures. In particular, redundant power is ordinarily provided by connecting two power supplies to backplane 400 as shown in FIG. 6. As illustrated, plugs 440 and 450 respectively mate with jacks 420 and 430 in order to provide power from power supplies 460 and 470 to the local power rail 410 of backplane 400. In the event of a power failure in one of the power supplies 460, 470, it should be appreciated that sufficient power is still provided to local power rail 410 by whichever power supply remains functional. As a result, backplane 400 is thus provided with power stability whenever a single power supply, 460 or 470, fails within this architecture.

Figure 7:
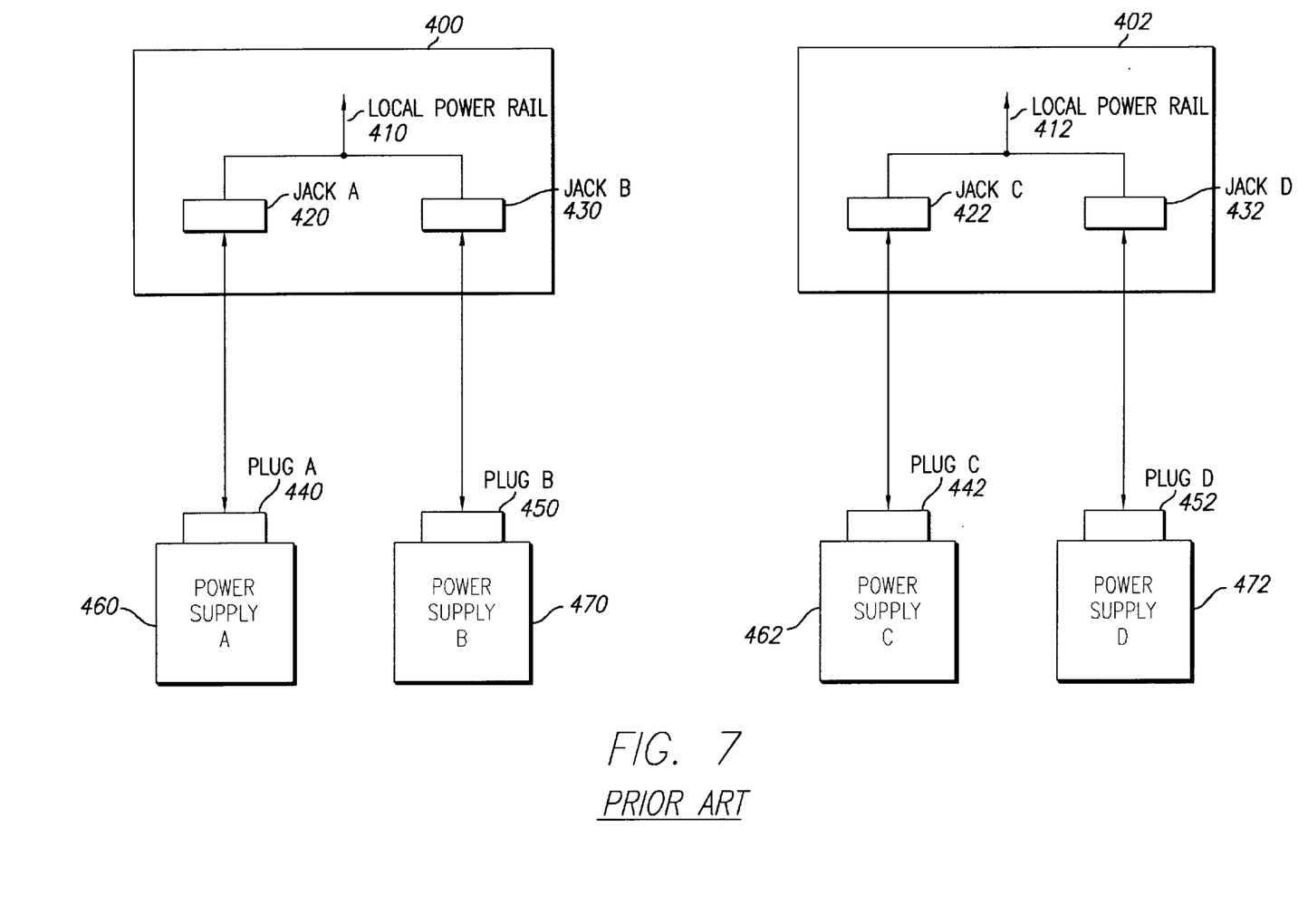
FIG. 7 is a schematic diagram showing a conventional method for providing power to multiple backplanes.

In order to accommodate systems using multiple backplanes 400, additional power supplies are ordinarily included in the art. In particular, the addition of a second backplane 402 typically requires the addition of two power supplies 462 and 472, as shown in FIG. 7. Similar to the aforementioned single-backplane architecture, a dual-backplane architecture routes redundant power to local power rail 410 from power supplies 460 and 470. Within this architecture, however, redundant power is also routed to local power rail 412 from power supplies 462 and 472 by respectively mating plugs 442 and 452 with jacks 422 and 432 as illustrated. As a result, backplane 402 is thus also provided with power stability whenever a single power supply, 462 or 472, fails within this architecture.

As previously mentioned, this architecture has drawbacks in supporting the emergence of more sophisticated backplanes requiring an increasing amount of power. In particular, the architecture described in FIG. 7 is limited in that the power available to either backplane, 400 or 402, is cut in half whenever one of its respective power supplies 460, 470, 462, or 472 fails. As a result, backplanes requiring additional power (i.e., more than a single power supply) do not have sufficient power within this type of architecture.

Figure 8:
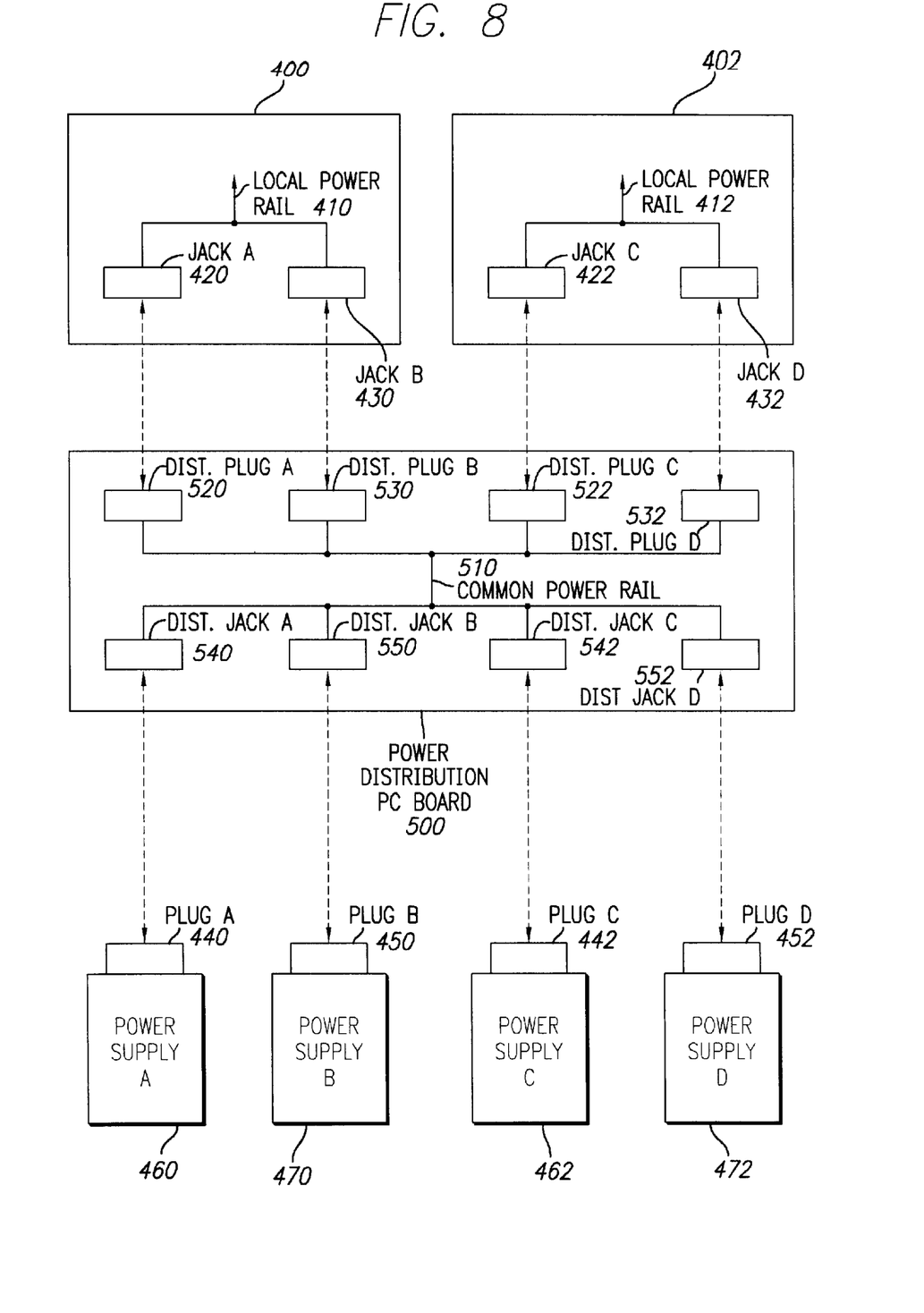
FIG. 8 is a schematic diagram of an exemplary architecture for distributing power to CPCI systems having two backplanes according to an embodiment of the invention.

The present invention addresses these drawbacks by providing an architecture in which additional power, taken from any power supply connected to the chassis 100, is it available to any of the backplanes of the CPCI system. Referring to FIG. 8, there is shown a schematic of a CPCI power-sharing scheme in which power is equally available to all backplanes in a chassis according to an embodiment of the invention. As illustrated, power supplies 460, 470, 462, and 472 deliver power to backplanes 400 and 402 via a power distribution printed circuit (PC) board 500. In particular, plugs 440, 450, 442, and 452 each respectively mate with power distribution jacks 540, 550, 542, and 552, in order to create a common power rail 510 on power distribution PC board 500. This common power rail 510 is then connected to power distribution plugs 520, 530, 522, and 532 which respectively mate with jacks 420, 430, 422, and 432. As a result, power is provided to backplanes 400, 402 by all four power supplies 460, 470, 462, and 472 via a common power rail 510 instead of only a particular pair of power supplies (e.g., power supplies 460 and 470 for backplane 400, and power supplies 462 and 472 for backplane 402). Within such embodiment, it should be appreciated that backplanes 400 and 402 equally share power between three power supplies whenever any single one of the four power supplies fails.

Figure 9:
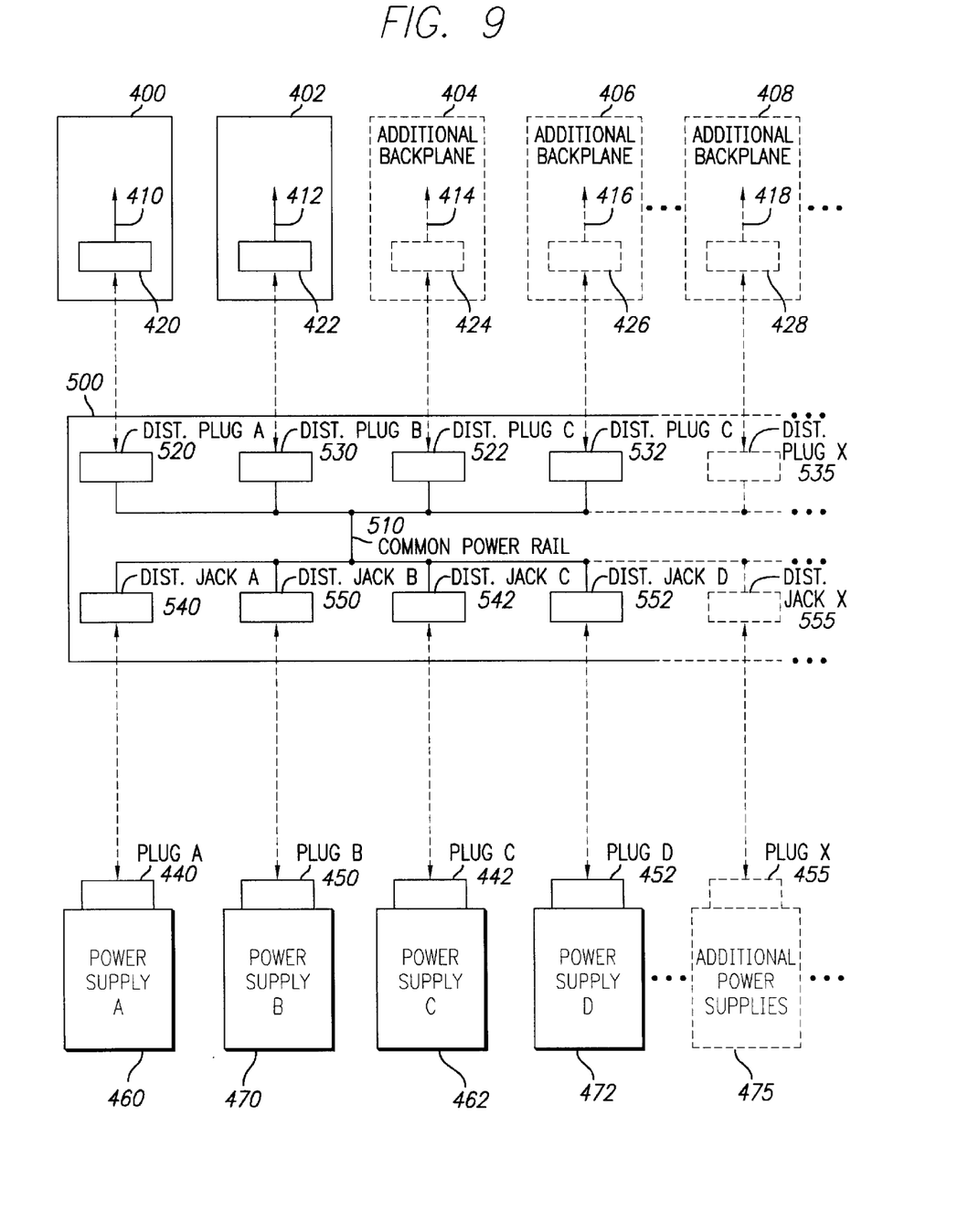
FIG. 9 is a schematic diagram of an exemplary architecture for distributing power to a variable number of backplanes according to an embodiment of the invention.

It should be further appreciated that power distribution PC board 500 may similarly be used to distribute power to a variable number of backplanes. Referring to FIG. 9, an example of how to distribute power to a variable number of backplanes is provided according to an embodiment of the invention. As illustrated, additional backplanes 404, 406, and 408 as well as additional power supplies 475 may be included within this particular CPCI computer system. It should, be noted that additional power distribution plugs 535 as well as additional power distribution jacks 555 may be included to power distribution PC board 500 as needed. In a preferred embodiment, power distribution PC board 500 may thus be customized in order to accommodate CPCI configurations requiring a variable number of backplanes as well as a variable number of power supplies.

Furthermore, it should be noted that backplanes 400, 402, 404, 406 and 408 are each illustrated as respectively having a single jack 420, 422, 424, 426, and 428. It should be apparent to those skilled in the art that the dual-jack architecture of conventional backplanes is not necessary within the described embodiment. Moreover, since power provided by all available power supplies is equally shared by all backplanes via common power rail 510, only one jack is needed per backplane. It should be appreciated that conventional backplanes having dual-jack architectures may still be used within the described embodiment. Preferred configurations would have only a single jack from each dual-jack backplane mate with a single power distribution plug in order to make more efficient use of all available power distribution plugs.

As is commonly practiced in the art, current sense circuits are used to adjust the voltage and current of a particular backplane during operation. In particular, the power a backplane requires may vary according to the particular application being run. Current sense circuits are then used to monitor these fluctuations in demand and adjust power accordingly. In another embodiment of the invention, current sense lines are used to provide output power isolation to the CPCI system as well as to variably adjust backplane power as needed.

Figure 10:
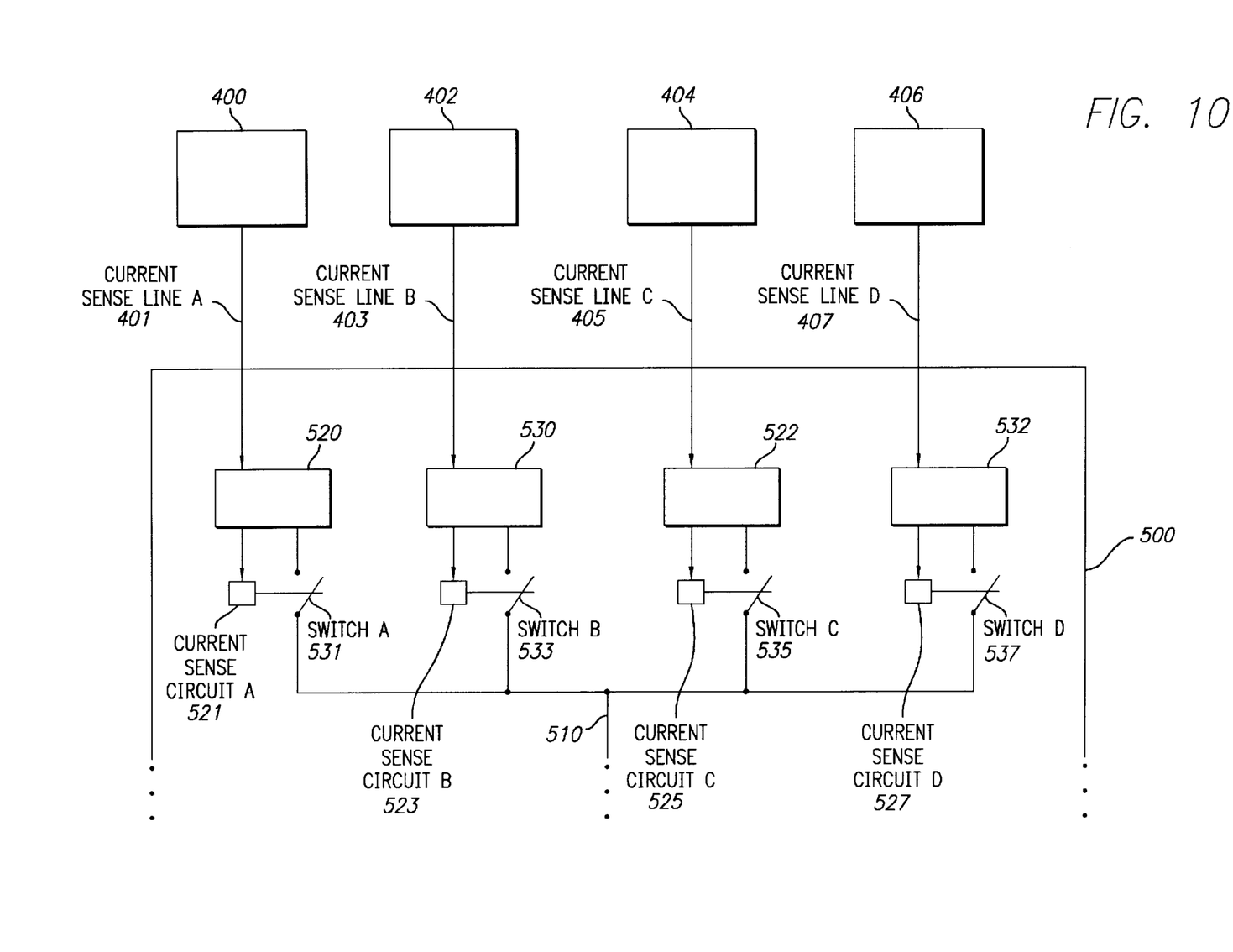
FIG. 10 is a schematic diagram of a current sense line implementation according to an embodiment of the invention.

Referring to FIG. 10, a schematic drawing is provided of a current sense line implementation according to another embodiment of the invention. As illustrated, current sense lines 401, 403, 405, and 407 respectively connect backplanes 400, 402, 404, and 406 to current sense circuits 521, 523, 525, and 527 on power distribution PC board 500. Current sense circuits 521, 523, 525, and 527 are then also respectively connected to switches 531, 533, 535, and 537.

Current sense circuits 521, 523, 525, and 527 are respectively used to isolate backplanes 400, 402, 404, or 406 if an excessive amount of power is being demanded (e.g., equivalent to a short circuit). More specifically, current sense circuits 521, 523, 525, and 527 will respectively disconnect backplanes 400, 402, 404, or 406 from common power rail 510 via switches 531, 533, 535, and 537 whenever excessive power is being demanded. It should thus be noted that, during normal operation, switches 531, 533, 535, and 537 respectively provide power to backplanes 400, 402, 404, and 406 by respectively connecting power distribution jacks 520, 530, 522, and 532 to common power rail 510. If an excessive demand in power is sensed by any one of the current sense circuits 521, 523, 525, 527, corresponding switches 531, 533, 535, 537 will open and thus disconnect the appropriate power distribution jack 520, 530, 522, 532 from common power rail 510. As a result, the CPCI system is provided with an architecture that isolates a failed backplane from the rest of the CPCI system.

Figure 11:
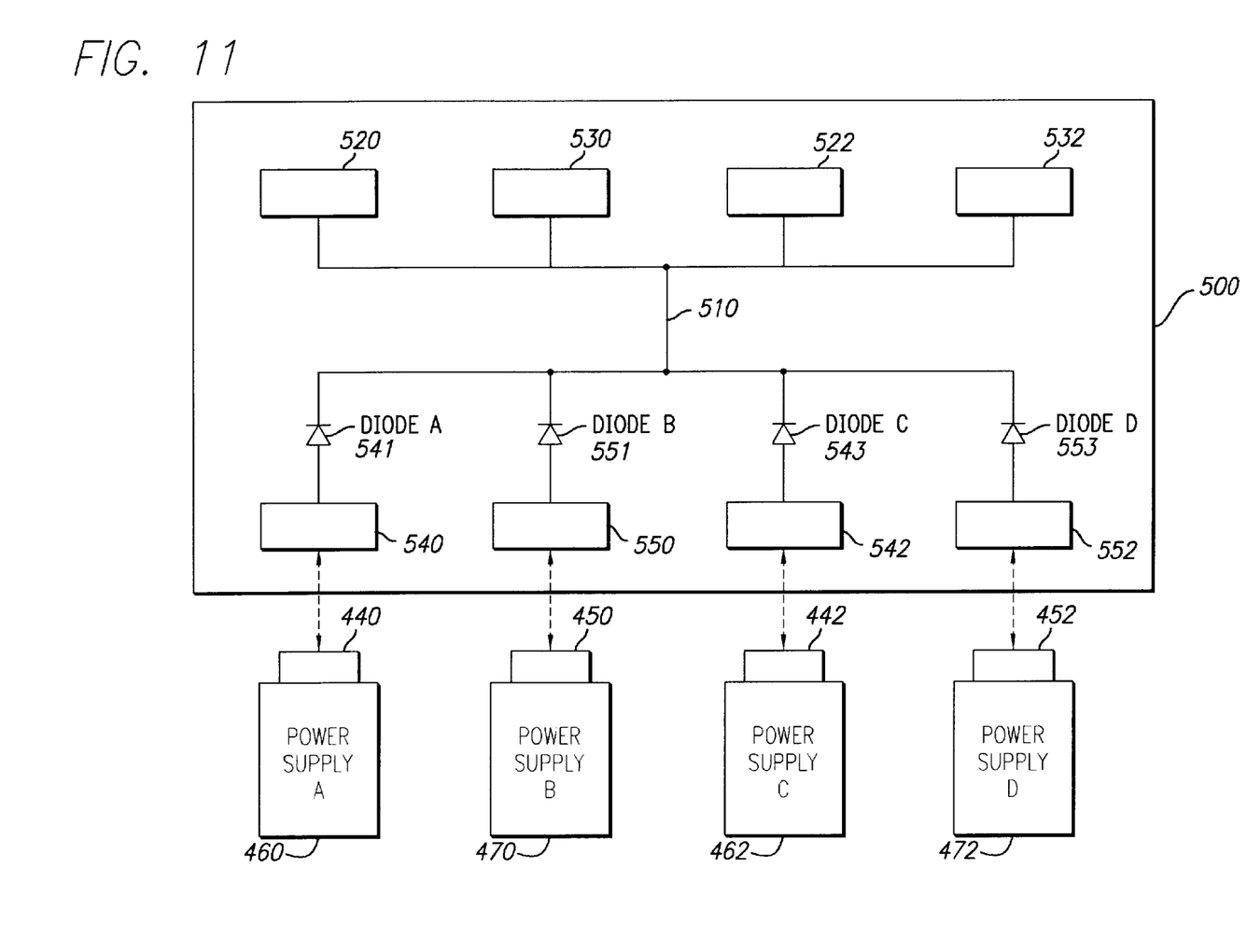
FIG. 11 is a schematic diagram of an input power isolation mechanism according to an embodiment of the invention.

It should be appreciated that, in cases where power supplies without an internal isolation mechanism are used (e.g., non-current-share power supplies and some current-share power supplies), a method for providing input power isolation to the CPCI system is desirable. In particular, it is desirable to include an input power isolation mechanism to CPCI systems in order to protect against the malfunctioning of a power supply. Referring to FIG. 11, a schematic drawing is provided of an input power isolation mechanism according to another embodiment of the invention. As illustrated, power distribution PC board 500 is modified to accommodate power supplies lacking an internal isolation mechanism through the use of diodes 541, 551, 543, and 553. More specifically, diodes 541, 551, 543, and 553 respectively connect power distribution jacks 540, 550, 542, and 552 to common power rail 510. It should be apparent to those skilled in the art that, by respectively connecting the anodes of each diode 541, 551, 543, and 553 to power distribution jacks 540, 550, 542, and 552 and connecting the cathodes of each diode 541, 551, 543, and 553 to common power rail 510 as shown, each power supply 460, 470, 462, and 472 is provided with a power isolation mechanism within this architecture. In particular, it should be apparent to those skilled in the art that, by respectively connecting diodes 541, 551, 543, and 553 as described above, any malfunctioning power supply will not be able to prevent the remainder of the CPCI system from functioning. Furthermore, it should be appreciated that, although diodes are used within this particular embodiment, any of several types of rectifying methods known in the art may be implemented as well.

Having thus described a preferred embodiment of a system and apparatus for distributing power in CPCI computer systems, it should be apparent to those skilled in the art that certain advantages of the within system have been achieved. It should also be appreciated that various modifications, adaptations, and alternative embodiments thereof may be made within the scope and spirit of the present invention. The invention is further defined by the following claims.

What is claimed is:

1. A compact peripheral component interconnect (CPCI) computer architecture, comprising:
    a plurality of CPCI systems each having respective backplanes, said backplanes further having respective local power rails providing power for a corresponding one of said plurality of CPCI systems;
    a power distribution system providing power to said backplanes, said power distribution system comprising a common power rail connected to each one of said local power rails of said backplanes; and
    a plurality of power supplies connected to said common power rail of said power distribution system;
    wherein power taken from any one of said plurality of power supplies is available to any one of said backplanes.

2. The CPCI computer architecture of claim 1, wherein said local power rails of said backplanes each further comprise a plurality of power jacks.

3. The CPCI computer architecture of claim 2, wherein said common power rail further comprises a plurality of distribution plugs adapted to be connected to said plurality of power jacks of said backplanes.

4. The CPCI computer architecture of claim 1, wherein said common power rail further comprises a plurality of distribution jacks adapted to be connected to said plurality of power supplies.

5. The CPCI computer architecture of claim 1, wherein said power distribution system further comprises a printed circuit (PC) board.

6. The CPCI computer architecture of claim 1, wherein said power distribution system further comprises a plurality of current sense circuits connected to respective ones of said backplanes.

7. A compact peripheral component interconnect (CPCI) computer architecture, comprising:
    a plurality of CPCI systems each having respective backplanes, said backplanes further having respective local power rails providing power for a corresponding one of said plurality of CPCI systems;
    a power distribution system providing power to said backplanes, said power distribution system comprising a common power rail connected to each one of said local power rails of said backplanes; and
    a plurality of power supplies connected to said common power rail of said power distribution system:
    wherein power taken from any one of said plurality of power supplies is available to any one of said backplanes;
    wherein said power distribution system further comprises a plurality of current sense circuits connected to respective ones of said backplanes; and
    wherein said power distribution system further comprises a plurality of switches coupled with said current sense circuits at least one of said current sense circuits controlling at least one of said switches and each of said plurality of switches being adapted to disconnect power from said power distribution system to a corresponding one of said backplanes upon detection of an excessive amount of power demanded by said corresponding one of said backplanes.

8. The CPCI computer architecture of claim 3, wherein said distribution plugs are connected to said common power rail via respective input power isolation circuits.

9. The CPCI computer architecture of claim 8, wherein said input power isolation circuits further comprise respective diodes.

10. The CPCI computer architecture of claim 1, wherein ones of said backplanes further comprise a plurality of slots, each of said slots comprising of at least one connector and each of said connectors having a column and row arrangement of connector-pins.

11. A power distribution system for use in a compact peripheral component interconnect (CPCI) computer architecture comprising a plurality of CPCI systems each having respective backplanes, said backplanes further having respective local power rails providing power for a corresponding one of said plurality of CPCI systems, said power distribution system comprises:
    a power distribution board providing power to said backplanes, said power distribution system comprising a common power rail connected to each one of said local power rails of said backplanes; and
    a plurality of power supplies connected to said common power rail of said power distribution system, wherein power taken from any one of said plurality of power supplies is available to any one of said backplanes.

12. The power distribution system of claim 11, wherein said local power rails of said backplanes each further comprise a plurality of power jacks.

13. The power distribution system of claim 12, wherein said common power rail further comprises a plurality of distribution plugs adapted to be connected to said plurality of power jacks of said backplanes.

14. The power distribution system of claim 11, wherein said common power rail further comprises a plurality of distribution jacks adapted to be connected to said plurality of power supplies.

15. The power distribution system of claim 11, wherein said power distribution board further comprises a printed circuit (PC) board.

16. The power distribution system of claim 11, wherein said power distribution board further comprises a plurality of current sense circuits connected to respective ones of said backplanes.

17. A power distribution system for use in a compact peripheral component interconnect (CPCI) computer architecture comprising a plurality of CPCI systems each having respective backplanes, said backplanes further having respective local power rails providing power for a corresponding one of said plurality of CPCI systems, said power distribution system comprises:

a power distribution board providing power to said backplanes, said power distribution system comprising a common power rail connected to each one of said local power rails of said backplanes; and a plurality of power supplies connected to said common power rail of said power distribution system;

wherein power taken from any one of said plurality of power supplies is available to any one of said backplanes;

wherein said power distribution board further comprises a plurality of current sense circuits connected to respective ones of said backplanes; and wherein said power distribution board further comprises a plurality of switches coupled with said current sense circuits, at least one of said current sense circuits controlling at least one of said switches and each of said plurality of switches being adapted to disconnect power from said power distribution board to a corresponding one of said backplanes upon detection of an excessive amount of power demanded by said corresponding one of said backplanes.

18. The power distribution system of claim 13, wherein said distribution plugs are connected to said common power rail via respective input power isolation circuits.

19. The power distribution system of claim 18, wherein said input power isolation circuits further comprise respective diodes.

\* \* \* \* \*